June 9, 1936.    F. G. MARSHALL    2,043,761
CHINCH BUG DESTROYING MACHINE
Filed May 3, 1935    2 Sheets-Sheet 2
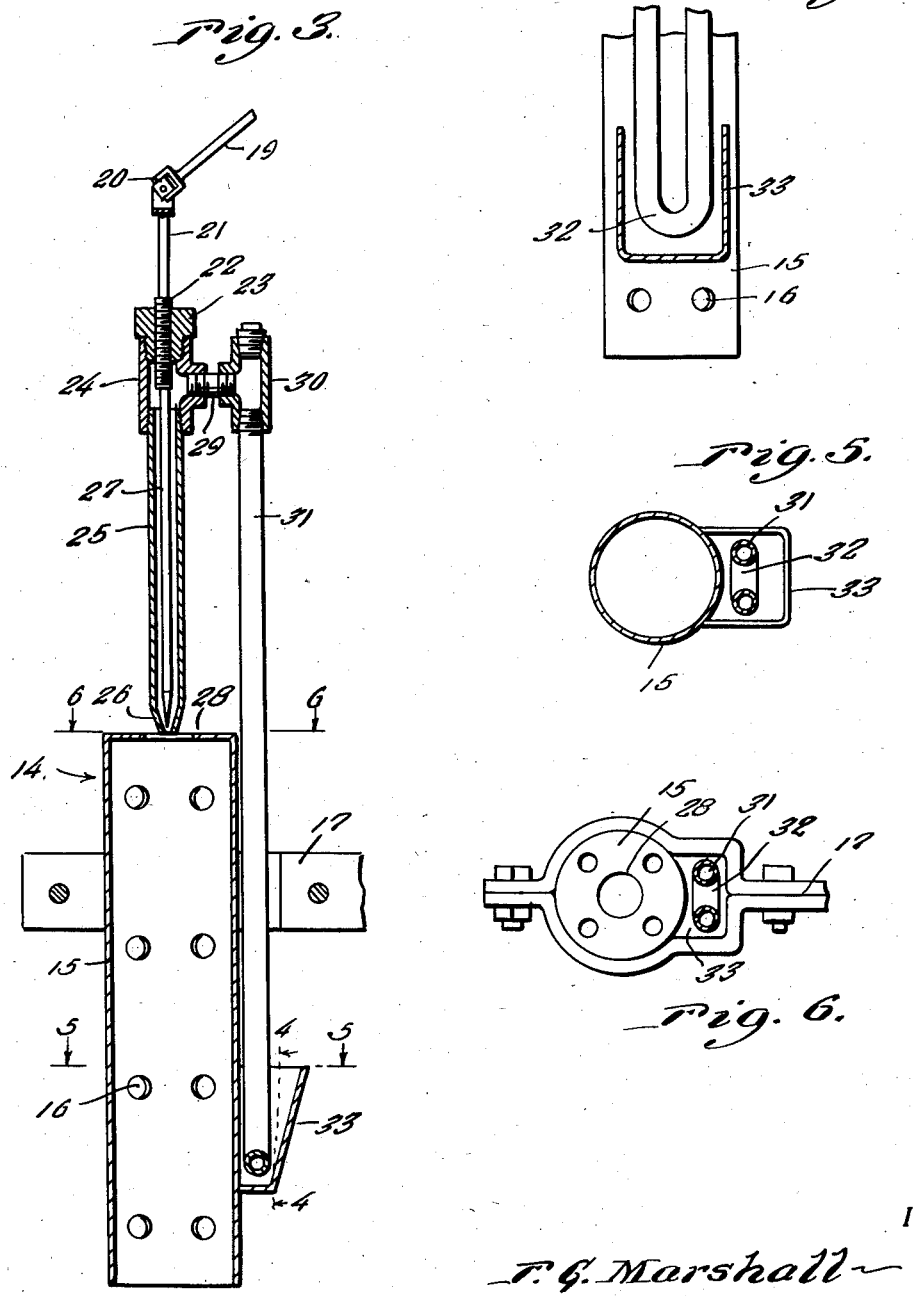
Inventor
*F. G. Marshall*
By *Clarence A. O'Brien*
Attorney Patented June 9, 1936

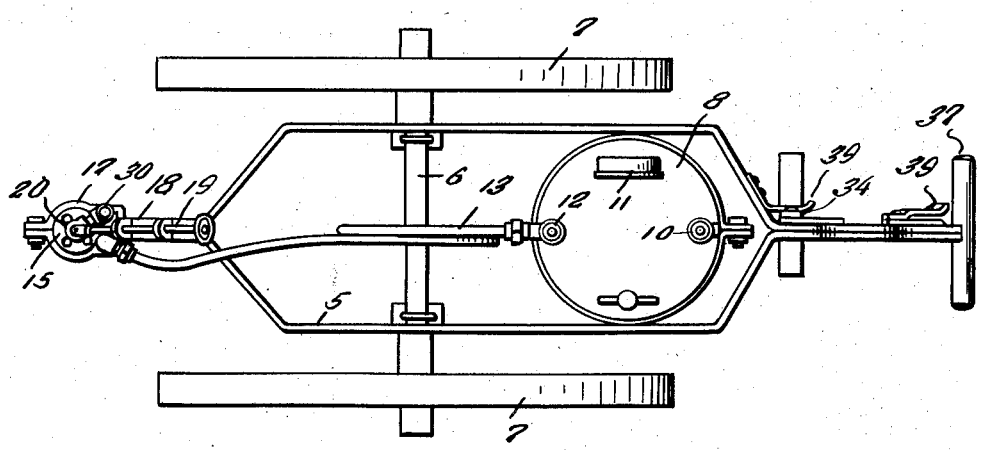

2,043,761

UNITED STATES PATENT OFFICE 2,043,761

CHINCH BUG DESTROYING MACHINE

Frank G. Marshall, Fortuna, Mo.

Application May 3, 1935, Serial No. 19,744

1 Claim. (Cl. 126—271.2)

This invention relates to new and useful improvements in apparatus for destroying insects known as chinch bugs which find their habitat on various kinds of growing grain. The present method is to trap the bugs in furrows and subsequently burn them while so trapped.

The principal object of the present invention is to provide an apparatus for facilitating this burning operation instead of resorting to the cumbersome and tiresome method of destroying insects by the use of a hand torch.

Another important object of the invention is to provide a machine for killing insects trapped in furrows wherein the machine can be run along the furrow with a flame well directed into the furrow for annihilating insects rapidly and without any discomfiture to the operator.

These and various other important objects of the invention will become apparent to the reader of the following specification.

In the drawings:

Figure 1 is a side elevational view of the machine.

Figure 2 is a top plan view of the machine.

Figure 3 is a vertical sectional view through the nozzle and valve structure.

Figure 4 is a fragmentary detailed sectional view taken substantially on line 4—4 of Figure 3.

Figure 5 is a cross sectional view taken substantially on line 5—5 of Figure 3.

Figure 6 is a cross sectional view taken substantially on line 6—6 of Figure 3.

Referring to the drawings wherein like numerals designate like parts, it can be seen that numeral 5 represents a frame having a single axis 6 disposed transversely thereon and suitably secured thereto, and on the ends of which are journaled the wheels 7.

A tank 8 is supported on the frame 5 in the vertical position shown in Figure 1, the head 9 of which is provided with a valved inlet 10 for compressed air. Numeral 11 represents a pressure gauge on the head 9, while numeral 12 represents the valved outlet to which the hose line 13 can be connected.

Numeral 14 generally refers to the burner nozzle which consists of the elongated vertically disposed barrel 15 having fire emission openings 16 therein.

An L-shaped bracket 17 is supported by the frame 5 and carries a U-shaped holder 18 at its upper end through which the hand wheel shaft 19 is journaled. A universal joint 20 connects the lower end of this hand wheel shaft 19 to the upper end of the valve stem 21, which valve stem, as shown in Figure 3, is provided with a threaded portion 22 feedable through the closure nut 23 in the upper end of the T-fitting 24, from which depends the tube 25, converging at its lower end as at 26 to provide a small port in which the needle valve 27 can seat, this valve being an extension of the stem 21. This port at the constricted end of the tube 25 is just at the opening 28 in the top of the flame spreading shell 15. The pipe connection 29 is made between the T-fitting 24 and the T-fitting 30 at the upper end of the pipe extension 31 which is bent at its lower end to provide a bight 32 depending into the priming cup 33. The opposite end of the tube 31 is connected to the remaining end of the hose 13 as at 34. Obviously, the tube 32 is heated by pouring some gasoline into the priming cup 33 and igniting the same so that gasoline from the tank 8 will be vaporized as it passes upwardly through the tube 31 to reach the nozzle structure generally referred to by numeral 14.

Numeral 34 represents a leg pivotally connected at its upper end as at 35 to the short arm 36. This leg 34 can be disposed in the position shown in Figure 1 when the machine is to be held still, when the same is being pushed by the hand bar 37, the leg 34 can be swung upwardly to the dotted line position in Figure 1, where it can be held by the spring clip 38. Furthermore the leg 34 is held in the useful position shown in Figure 1 by a spring clip 39.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

An insect destroying machine comprising a wheeled frame, a vertically disposed shell mounted on the frame and provided with apertures in the side wall thereof, said shell being fully open at its lower end and provided with a constricted opening at its upper end, a nozzle having its discharge end at the said constricted opening, a fuel supply line, a narrow priming cup secured to the outside of the said shell, said fuel line being formed to provide a narrow bight portion depending into the said priming cup, said supply line being connected to the said nozzle.

FRANK G. MARSHALL.